United States Patent [19]
Nguyen et al.

[11] Patent Number: 6,087,591
[45] Date of Patent: Jul. 11, 2000

[54] INSULATED ELECTRICAL CONDUCTORS

[76] Inventors: Phu D. Nguyen, 1477 Asheboro Ct., San Jose, Calif. 95131; Ismael L. Sandoval, 3241 Holly Dr., Apt. B, Tracy, Calif. 95376; Stephen L. Tondre, 33455 Caliban Dr., Fremont, Calif. 94555; Alan S. Yeung, 724 Portwalk Pl., Redwood City, Calif. 94065

[21] Appl. No.: 08/690,092

[22] Filed: Jul. 31, 1996

Related U.S. Application Data

[63] Continuation-in-part of application No. 08/429,384, Apr. 26, 1995, abandoned.

[51] Int. Cl.[7] .................................................. H01B 7/00
[52] U.S. Cl. ............................ 174/110 R; 174/120 R; 174/120 SR; 174/110 SR
[58] Field of Search ................................ 174/15.1, 16.1, 174/110 SR, 120 R, 17.05; 428/375, 379; 525/444

[56] References Cited

U.S. PATENT DOCUMENTS

| | | | |
|---|---|---|---|
| 2,167,278 | 3/1939 | Leatherman | 134/78.6 |
| 2,683,100 | 7/1954 | Edgar et al. | 117/128.4 |
| 3,671,487 | 6/1972 | Abolins | 260/40 R |
| 3,766,146 | 10/1973 | Witsiepe et al. | 260/75 R |
| 3,835,089 | 9/1974 | Fox et al. | 260/40 R |
| 3,907,926 | 9/1975 | Brown et al. | 260/860 |
| 3,953,394 | 4/1976 | Fox et al. | 524/86 |
| 3,957,905 | 5/1976 | Sumoto et al. | 260/860 |
| 3,962,530 | 6/1976 | Jones | 174/15.1 X |
| 4,013,613 | 3/1977 | Abolins et al. | 260/40 R |
| 4,024,102 | 5/1977 | Stackman et al. | 260/40 R |
| 4,048,178 | 9/1977 | Eastman | 260/22 R |
| 4,102,868 | 7/1978 | Genetti et al. | 260/858 |
| 4,113,692 | 9/1978 | Wambach | 260/40 R |
| 4,115,333 | 9/1978 | Phipps, Jr. et al. | 260/22 R |
| 4,123,415 | 10/1978 | Wambach | 524/451 |
| 4,125,571 | 11/1978 | Scott et al. | 260/860 |
| 4,332,855 | 6/1982 | Zingheim et al. | 428/379 |
| 4,369,282 | 1/1983 | Campbell | 524/445 |
| 4,483,970 | 11/1984 | Huntjens et al. | 525/440 |
| 4,557,544 | 12/1985 | Esser | 439/391 |
| 4,716,079 | 12/1987 | Sano et al. | 428/383 |
| 4,767,668 | 8/1988 | Smith et al. | 428/379 |
| 4,788,248 | 11/1988 | Maresca et al. | 525/66 |
| 4,801,501 | 1/1989 | Harlow | 428/383 |
| 4,859,741 | 8/1989 | Takahashi et al. | 525/123 |
| 5,079,320 | 1/1992 | Kappler et al. | 526/249 |
| 5,225,635 | 7/1993 | Wake et al. | 174/110 PM |
| 5,248,713 | 9/1993 | Lunk et al. | 524/120 |
| 5,304,594 | 4/1994 | Saitou | 524/495 |

FOREIGN PATENT DOCUMENTS

| | | | |
|---|---|---|---|
| 55-80206 | 6/1980 | Japan | H01B 7/18 |
| 57-165906 | 10/1982 | Japan | H01B 7/02 |
| 710080 | 1/1980 | U.S.S.R. | H01B 7/02 |
| 2 012 288 | 7/1979 | United Kingdom | C08G 18/36 |
| WO 89-00758 WO | 1/1989 | WIPO | H01B 7/02 |
| 89/00759A | 1/1989 | WIPO | H01B 7/02 |
| WO 94/16014 | 7/1994 | WIPO | C08L 67/02 |
| WO 96/02591 | 2/1996 | WIPO | C08K 11/00 |

OTHER PUBLICATIONS

U.S. Application Serial No. 08/004,749, filed Jan. 14, 1993.
U.S. Application Serial No. 08/275,174, filed Jul. 14, 1994.
U.S. Application Serial No. 08/435,339, filed May 4, 1995.

*Primary Examiner*—Kristine Kincaid
*Assistant Examiner*—William H. Mayo, III

[57] ABSTRACT

Polymeric compositions which contain a thermoplastic aromatic polyester, preferably polybutylene terephthalate, and a polyester block copolymer having a recrystallization temperature greater than 150° C., preferably a thermoplastic elastomer containing aromatic polyester blocks and aliphatic polyester blocks. The ratio of the block copolymer to the aromatic polyester is 0.05:1 to 0.35:1, preferably 0.15:1 to 0.30:1. These compositions are particularly useful as the insulation on hermetic lead wires for use in refrigerant systems. To prevent cracking of such insulation when it is contacted by a varnish used to provide hermetic sealing, it can be covered by a thin layer of a fluoropolymer.

29 Claims, 1 Drawing Sheet

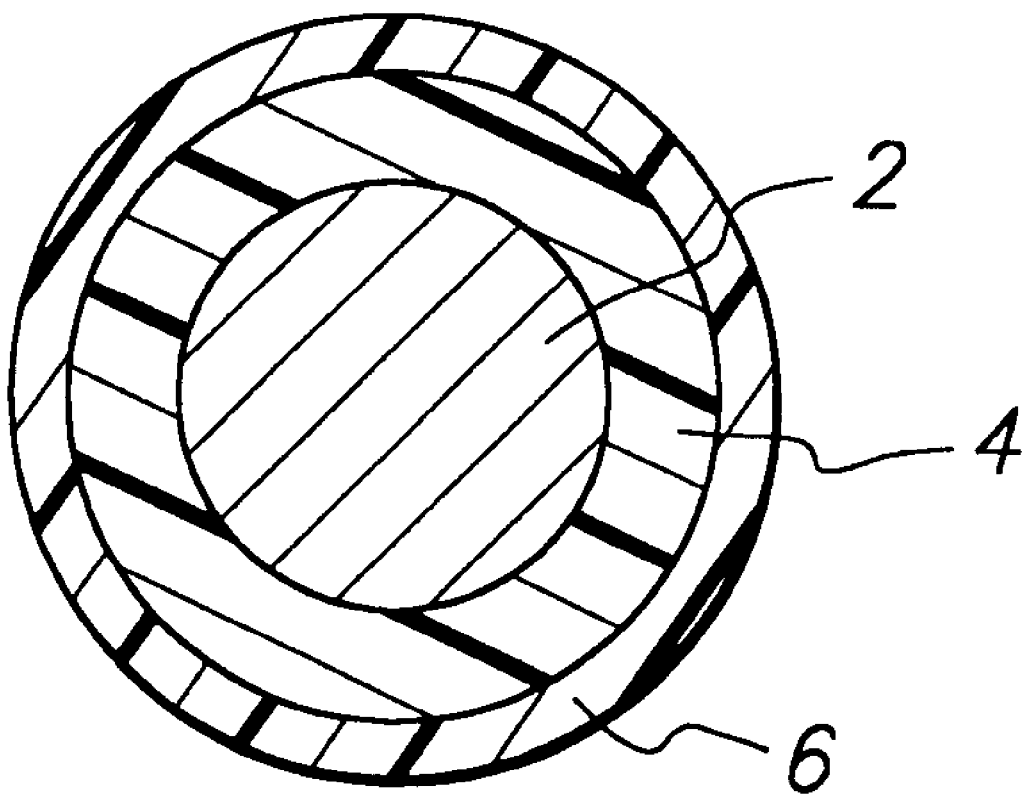
FIGURE

INSULATED ELECTRICAL CONDUCTORS

CROSS-REFERENCE TO RELATED APPLICATIONS

This application is a continuation-in-part of application Ser. No. 08/429,384 which was filed Apr. 26, 1995, by Nguyen, Tondre and Yeung (Docket No. 1517-US1), and the entire disclosure of which is incorporated herein by reference for all purposes, now abandoned.

BACKGROUND OF THE INVENTION

1. Field of the Invention

This invention relates to novel polyester compositions and to insulated electrical conductors, especially insulated wires for use as lead wires in refrigeration systems and other hermetically sealed electrical apparatus (often called "hermetic lead wires").

2. Introduction to the Invention

Many polyester compositions are known, including compositions which can be melt-shaped, e.g. melt-extruded around a conductor to provide an insulating coating. The physical and electrical properties of such polyester compositions are of course very important, and a great variety of polyester compositions have, therefore, been used or proposed for use, particularly as insulating coatings on wires. Reference may be made for example to U.S. Pat. Nos. 2,167,278, 3,671,487, 3,835,089, 4,048,128, 4,332,855, 4,767,668, 4,483,970 and 5,248,713, and to copending, commonly assigned U.S. patent application Ser. Nos. 08/275,174 filed Jul. 14, 1994 (MP1467-US2), 08/429,384 filed Apr. 26, 1995 (Docket No. MP1517-US1) and 08/435,339 filed May 4, 1995 (Docket No. MP1566-US1). The entire disclosure of each of said patents and patent applications is incorporated by reference herein for all purposes.

In conventional hermetic lead wires, the insulation is a wrapped polyester tape sandwiched between two polyester fiber braids. Such insulation is expensive and difficult to apply. U.S. Pat. No. 5,225,635 (Wake et al.), the disclosure of which is incorporated herein by reference, discloses a hermetic lead wire in which the insulation comprises an insulating layer made by melt-extruding a composition containing chlorosulfonated polyethylene, an acid acceptor, a filler, and a peroxide crosslinking agent.

SUMMARY OF THE INVENTION

We have discovered, in accordance with the present invention, that very useful compositions can be made by modifying polytetramethylene terephthalate (also referred to as PTMT, polybutylene terephthalate, and PBT) or a like aromatic polyester by addition thereto of a second polymer which has a recrystallization temperature greater than 150° C. and is a polyester block copolymer. These compositions are referred to herein as "modified PBT compositions", although the polyester can contain other units in addition to butylene terephthalate units. Such compositions have an excellent combination of resistance to deterioration by refrigerants and retention of physical properties when subjected to heat aging, and are particularly suitable for use as insulation on hermetic lead wires.

However, it has been found, when testing such insulated wires as hermetic lead wires, that under some circumstances, the insulation ceases to be fully effective, because cracks develop in it. We have discovered that this cracking problem is caused by contact between the insulation and certain sealing compositions (often referred to as "varnishes") which are used to provide hermetic seals around the compressor motors which are used in refrigeration systems and to which the lead wires carry power. The varnish may be for example a dispersion of acrylic polymers in water (for example the products sold by duPont under the trade names LACTON and CAVALITE), or a dispersion of a phenolic epoxy polymers in water (for example the product sold by Schenectady under the trade name Isopoxy 800). After the hermetic lead wires have been attached to the compressor motor, the housing containing the compressor motor is dipped into a bath of the varnish. Even if the lead wires do not enter the bath, the varnish drips onto, or is splashed onto, the lead wires. When the varnish is cured, it forms a brittle coating which adheres tenaciously to the modified polyester insulation. If the wire is flexed, the varnish cracks, forming a notch from which cracking of the modified polyester layer can propagate.

We have further discovered, in accordance with the present invention, that this problem can be mitigated by coating the insulation of the hermetic lead wire, at least in the area which may be contacted by the varnish, with a layer of a protective material, preferably a fluoropolymer, which prevents the cured varnish from adhering to the modified polyester insulation. Preferably the protective material is in the form of an outer coating of a polymeric composition which covers the modified PBT layer over the whole length of the insulated wire. In the latter case, the protective material may also reduce the amount of extractables when the insulation is contacted by a chlorofluorocarbon (CFC) refrigerant or other refrigerant. We believe that the use of such protective materials will also reduce cracking of other insulating compositions, particularly compositions which are based on PBT or the like, especially when they may be contacted by varnishes and like compositions, and/or reduce extractables from such insulating compositions when contacted by refrigerants. Disclosures of PBT insulating compositions are to be found in, for example U.S. Pat. Nos. 4,332,855 (MP0267), 4,767,688 (RK255), 5,248,713 (MP1360) and copending commonly assigned U.S. patent application Ser. Nos. 08/004,749 (MP1467-US1), 08/275,174 (MP1467-US2) and 07/435,395 (RK334) as well as Ser. Nos. 08/275,174, 08/429,384 and 08/435,339 already referred to. The disclosure of each of these U.S. Patents and applications is incorporated herein by reference.

In a first preferred aspect, this invention provides a polymeric composition which can be melt-extruded or which has been melt-extruded, and which comprises a polymeric component which comprises a blend of (1) a thermoplastic aromatic polyester which consists essentially of 70 to 100% by weight of tetramethylene terephthalate units and 0 to 30% of other units which are randomly copolymerized with the tetramethylene terephthalate units, and (2) a second polymer which has a recrystallization temperature greater than 150° C. and is a polyester block copolymer;

the ratio by weight of the second polymer (2) to the aromatic polyester (1) being from 0.05:1 to 0.35:1. The term "polymeric component" is used in this specification to denote that part of the composition which is made up of polymeric material. The composition can consist of the polymeric component or it can also contain a non-polymeric component.

In a second preferred aspect, the invention provides an insulated electrical device which comprises a metal conductor, preferably a wire, and an insulating jacket comprising a melt-shaped layer of a composition according to the first preferred aspect of the invention.

In a third preferred aspect, this invention provides an insulated electrical device which comprises a metal conductor, preferably a wire, and an insulating jacket which surrounds the conductor, the insulation comprising (A) an inner layer composed of a first melt-extruded polymeric composition which comprises a polymeric component which comprises a blend of
  (1) a thermoplastic aromatic polyester which consists essentially of 70 to 100% by weight of tetramethylene terephthalate units and 0 to 30% of other units which are randomly copolymerized with the tetramethylene terephthalate units, and
  (2) a second polymer which has a recrystallization temperature greater than 150° C. and is a polyester block copolymer;
the ratio by weight of the second polymer (2) to the aromatic polyester (1) being from 0.05:1 to 0.35:1; and
(B) an outer layer composed of a second melt-extruded polymeric composition which comprises a polymeric component which consists essentially of one or more fluoropolymers.

In a fourth preferred aspect, the invention provides an electrical assembly which comprises a hermetically sealed enclosure containing a refrigerant liquid and an insulated electrical conductor within the enclosure and contacted by the refrigerant, wherein said conductor is as defined in the second or third preferred aspect of the invention.

In a fifth preferred aspect, the invention provides an electrical assembly which comprises an electrical motor, an insulated hermetic lead wire for delivering electrical power to the motor, a housing which surrounds the motor, and a layer of a cured epoxy polymer varnish which hermetically seals the housing and which extends over at least part of the insulated lead wire, the lead wire (i), when subjected to the CFC extraction test, having less than 0.8% by weight extractables, and (ii) comprising a wire and polymeric insulation surrounding the wire, the insulation comprising (A) an inner layer composed of a first melt-extruded polymeric composition which comprises a blend of
  (1) a thermoplastic aromatic polyester, and
  (2) a second polymer which has a recrystallization temperature greater than 150° C. and is a polyester block copolymer; and
(B) an outer layer which is composed of a second melt-extruded polymeric composition comprising a fluoropolymer and which, when the varnish on the surface of the insulated wire cracks, prevents the cracking of the varnish from causing cracking of the inner layer of insulation.

BRIEF DESCRIPTION OF THE DRAWING

The invention is illustrated in the drawing, in which the FIGURE is a cross-section through an insulated wire of the invention which comprises a metal conductor 2 surrounded and contacted by insulating layer 4 which is composed of a modified PBT composition, and by insulating layer 6 which is composed of a fluoropolymer.

DETAILED DESCRIPTION OF THE INVENTION

Parts and percentages given in this specification are by weight unless otherwise noted.

Modified PBT Insulation

The modified PBT compositions which are used in this invention can be melt shaped, preferably melt extruded around a conductor, e.g. a solid or stranded wire, to provide an insulating layer which surrounds the wire. Generally the wire size is 4 to 38 AWG, preferably 10 to 30 AWG. When the wire is to be used as a hermetic lead wire, it is preferably a stranded wire. The term "layer" is used herein to denote a layer which is the sole insulating layer around the conductor; a layer which is one of several insulating layers around the conductor (the modified PBT composition being the innermost layer, or an intermediate layer or the outermost layer, except in the third preferred aspect of the invention, when the protective layer covers the modified PBT layer); or an insulating jacket around two or more conductors each having an individual insulating coating around it. The thickness of the layer is generally 0.002 to 0.030 inch, preferably 0.003 to 0.015 inch. However, it is to be understood that the invention is also applicable to other melt-shaped configurations, e.g. tubing and molded parts, and to compositions which can be shaped in other ways, and to compositions whose prime function is not to provide electrical insulation.

The Aromatic Polyester

Component (1) of the modified PBT compositions is an aromatic polyester which contains 70 to 100%, preferably 95 to 100%, particularly 100%, by weight of tetramethylene terephthalate units, and in which any other units are randomly copolymerized with the tetramethylene terephthalate units. Such other units can be, for example, other alkylene terephthalate units, e.g. ethylene terephthalate units, or aliphatic polyester units.

The Polyester Block Copolymer

The polyester block copolymer used in this invention to modify the aromatic polyester is preferably a thermoplastic elastomer (TPE) comprising aromatic polyester blocks and aliphatic polyester blocks. The melting point of the TPE is preferably greater than 170° C., particularly greater than 180° C., especially greater than 200° C. The percentage by weight of aromatic polyester blocks is generally 10 to 90%, preferably 37 to 90%, particularly 70 to 90%. The aromatic and aliphatic polyester blocks can be linked together, for example, through ester groups and/or urethane groups, for example through a urethane group of the formula

where n is 2 to 6, preferably 4, and Ar is an aromatic radical, preferably 1,4-phenylene.

The repeating units in the aromatic polyester blocks have the formula

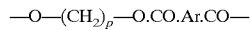

where p is at least 2, preferably 2 to 6, particularly 4, and Ar is an arylene group, preferably a 1,4-phenylene group. Preferably all the repeating units are the same, especially tetramethylene terephthalate units.

The repeating units in the aliphatic polyester blocks have the formula

wherein each of q and r, which may be the same or different, is at least 2, preferably 2 to 6, particularly 4. Preferably all the repeating units are the same.

Suitable block polyesters are available from DSM Engineering Plastics under the trade name "ARNITEL", e.g. ARNITEL UM550, UM551, and UX4854, and are described in U.S. Pat. No. 4,483,970 (Huntjens et al., assigned to Akzo N.V.), the disclosure of which is incorporated herein by reference.

Relative Amounts of Block Copolymer and Aromatic Polyester

The ratio by weight of the polyester block copolymer to the aromatic polyester is preferably 0.05:1 to 0.35:1, particularly 0.15:1 to 0.30:1, especially 0.22:1 to 0.27:1.

Other Polymeric Ingredients

The polymeric component of the modified PBT compositions preferably consists essentially of the polyester block copolymer and the aromatic polyester, but can also contain one or more other polymers (e.g. other polyesters, including homopolymers and random and block copolymers, such as polyethylene terephthalate), preferably in amount less than 20%, particularly less than 10%, based on the weight of the aromatic polyester.

Non-Polymeric Ingredients

The modified PBT compositions can contain non-polymeric ingredients, generally in amount less than 20%, preferably less than 10%, particularly less than 4%, by weight based on the weight of the composition. Such additives can be inorganic or organic, and include antioxidants, stabilizers, processing aids, coloring agents, fillers and flame retardants, including antimony trioxide, e.g. in amount 3–15%, and brominated flame retardants, e.g. in amount 5 to 15%. For further details of suitable additives, reference may be made to the documents incorporated herein by reference.

For use on hermetic lead wires, the modified PBT composition preferably has less than 0.8%, particularly less than 0.6%, especially less than 0.35% extractables when subjected to the CFC extraction test described below. Such compositions can for example be obtained by blending an aromatic polyester which has less than 0.3% extractables with a polyester block copolymer which has more than 1.2% extractables in the CFC extraction test. When the hermetic lead wire is to be used with a refrigerant which is not the CFC specified in the CFC extraction test (chlorodifluoromethane, often referred to by a trade name, Freon 22), the modified PBT composition preferably has a similarly low level of extractables in a test which is the same as the CFC extraction test except that the Freon 22 is replaced by the refrigerant actually used.

The melt-extruded insulating modified PBT jacket preferably has an initial elongation of at least 200%, particularly at least 300%, especially at least 360%, and an elongation of at least 200%, particularly at least 300%, especially at least 360%, after aging for 168 hours at 156%.

Protective Materials

When the modified PBT insulation is used in a system which causes it to be contacted by a varnish, as discussed above, it is preferably protected by means of a protective material which is applied over the modified PBT insulation before it is contacted by the varnish.

The polymeric component in the protection material is preferably a fluoropolymer. The term "fluoropolymer" is used herein to denote a polymer or mixture of polymers which can be melt-extruded and which contains more than 10%, preferably more than 25%, by weight of fluorine. Thus the fluorocarbon polymer may be a single fluorine-containing polymer, a mixture of two or more fluorine-containing polymers, or a mixture of one or more fluorine-containing polymers with one or more polymers which do not contain fluorine. Preferably the fluoropolymer comprises at least 50%, particularly at least 75%, especially at least 85%, by weight of one or more thermoplastic crystalline polymers each containing at least 25% by weight of fluorine, a single such crystalline polymer being preferred. Such a fluoropolymer may (but preferably does not) contain, for example, a fluorine-containing elastomer and/or a polyolefin, preferably a crystalline polyolefin, in addition to the crystalline fluorine-containing polymer or polymers. The fluorine-containing polymers are generally homo- or co-polymers of one or more fluorine-containing olefinically unsaturated monomers, or copolymers of one or more such monomers with one or more olefins. The fluoropolymer may have a melting point of at least 200° C., e.g. up to 300° C. Preferably the polymeric composition has a flex modulus similar to the flex modulus of the modified PBT layer, so that it does not wrinkle when the insulated wire is bent. A preferred copolymer is a ethylene/chlorotrifluoro-ethylene copolymer, this term being ued to denote a copolymer of ethylene and chlorotrifluoroethylene, and optionally one or more other comonomers, which contains at least 80% by weight of units derived from ethylene and chlorotrifluoro-ethylene and in which the molar ratio of ethylene units to chlorotrifluoro-ethylene units is from 0.5:1 to 1.5:1, preferably 0.85:1 to 1.15:1, e.g. about 1:1. Another preferred fluoropolymer is a copolymer of ethylene and tetrafluoroethylene, this term being used to denote a copolymer of ethylene and tetrafluoroethylene and optionally one or more other comonomers, which contains at least 80% by weight of units desired from ethylene and tetrafluoroethylene, and in which the molar ratio of ethylene units to tetrafluoroethylene units is from 0.5:1 to 1.5:1, preferably 0.85:1 to 1.15:1, e.g. about 1:1. Other fluoropolymers are copolymers of vinylidene fluoride with one or more of hexafluoropropylene, tetrafluoroethylene, and hexafluoroisobutylene; and copolymers of tetrafluoroethylene and hexafluoropropylene.

The protective material can contain non-polymeric ingredients as specified above for the modified PBT compositions. However, since the protective material need only protect the modified PBT composition from the effects of the varnish, such non-polymeric ingredients are generally used, if at all, only in small quantities.

When, as is preferred, the protective material is in the form of a layer covering the modified PBT insulation, the protective layer is preferably less than 0.008 inch thick, particularly 0.0005 to 0.005 inch thick, e.g. 0.0015 to 0.0025 inch thick.

EXAMPLES

The invention is illustrated by the following Examples.

Examples 1–10

Examples 1–10 are summarized in the Table below. In the Table, the following abbreviations are employed.

| | |
|---|---|
| TPE 1 | The TPE sold by DSM Engineering Plastics under the trade name ARNITEL UX4854. |
| TPE 2 | The TPE sold by DSM Engineering Plastics under the tradename ARNITEL UM551V. ARNITEL UX4854 and UM551V are believed to be TPE's as defined above in which Ar is a phenylene group, each of p, q and r is 4, and the aromatic and aliphatic polyester blocks are linked together through a urethane group of the formula —O—(CH$_2$)$_4$—OOC.NH.Ar.CH$_2$.Ar.NH CO— where Ar is 1,4-phenylene. |
| PBT | The polybutylene terephthalate sold by Hoechst Celanese under the trade name Celanex 1600A. |
| WT10, BK10, RD10, RD11, and OR10 | The color concentrates sold by WILSON Color Inc. under the tradenames WILSON-89-WT-10, WILSON-89-BK-10, WILSON-89-RD-10, WILSON-89-RD-11, and WILSON-89-OR-10, respectively. |

In each of the Examples, the ingredients and amounts thereof shown in Table 1 were mixed together and melt extruded as an insulating jacket of the wall thickness (in mils) shown in the Table over a stranded copper wire of the diameter (in mils) shown in the Table. The resulting insulated wire was tested to determine one or more of its Heat Aging, Extractables, Elongation and Tensile Strength. The procedures used in these tests are described below. The results are shown in the Table.

Resistance to Heat Aging is measured by the method of ASTM D 3032, Section 14. The results given are the average times to failure (in hours) for ten specimens aged at the indicated temperature. The Table also includes estimated minimum times for aging at 125° C. (with 18k etc. meaning 18,000 hours etc).

Extractables is measured by the CFC Extraction Test described in NEMA Publication MW1000, paragraph 3.55. Elongation % and Tensile Strength (psi) are measured by the method of ASTM D 3032, Section 14, both initially and after aging for 168 hours at 156° C. ("aged" in Table).

Example 12 (Comparative)

The procedure of Example 11 was followed except that the outer ECTFE layer was not applied. When the wire was flexed after the varnish coating had been cured, both the varnish layer and the modified PBT insulating layer cracked.

What is claimed is:

1. An electrical assembly which comprises a hermetically sealed enclosure containing a refrigerant liquid and an insulated electrical wire which is within the enclosure and is contacted by the refrigerant, said insulated wire comprising a wire and, surrounding the wire, a layer of a melt-extruded electrically insulating composition which comprises a polymeric component comprising a blend of
   (1) a thermoplastic aromatic polyester which consists essentially of 70 to 100% by weight of tetramethylene terephthalate units and 0 to 30% of other units which

TABLE

| Ingredients | Example No. | | | | | | | | | |
|---|---|---|---|---|---|---|---|---|---|---|
| | 1 | 2 | 3 | 4 | 5 | 6 | 7 | 8 | 9 | 10 |
| PBT | 78 | 78 | 78 | 78 | 78 | 78 | 84.5 | 84.5 | 84.5 | 84.5 |
| TPE 1 | 20 | 20 | 20 | 20 | 20 | 20 | — | — | — | — |
| TPE 2 | — | — | — | — | — | — | 12.5 | 12.5 | 12.5 | 12.5 |
| WT10 | 2 | — | — | 2 | — | — | 3 | — | — | — |
| BK10 | — | 2 | — | — | 2 | — | — | 3 | — | — |
| RD10 | — | — | — | — | — | 2 | — | — | — | 3 |
| RD11 | — | — | 2 | — | — | — | — | — | 3 | — |
| OR10 | — | — | — | — | — | — | — | — | — | 1 |
| Wire Diam. | 49 | 49 | 49 | 49 | 49 | 49 | 49 | 49 | 49 | 49 |
| Wall Thickness | 8 | 8 | 8 | 16 | 16 | 16 | 16 | 16 | 16 | 16 |
| Heat Aging at | | | | | | | | | | |
| 190° C. | 139 | 126 | 165 | 132 | 134 | 117 | | | | |
| 180° C. | 266 | 252 | 273 | 285 | 271 | 256 | | | | |
| 170° C. | 534 | 508 | 534 | 516 | 525 | 511 | | | | |
| Est. Min. at 125° C. | 18 k | 19 k | 11 k | 18 k | 18 k | 24 k | | | | |
| Extractables | | | | | | | | | | |
| R22 | | | | 0.28 | 0.29 | 0.28 | 0.4 | 0.5 | 0.4 | 0.5 |
| R134A | | | | | | | 0.3 | 0.2 | 0.5 | 0.1 |
| Elongation | | | | | | | | | | |
| Initial | 364 | 374 | 379 | 438 | 452 | 440 | 390 | 398 | 400 | 408 |
| Aged | 401 | 405 | 411 | 495 | 495 | 487 | 436 | 436 | 415 | 360 |
| Tensile Strength | | | | | | | | | | |
| Initial | 7098 | 7240 | 7258 | 9680 | 9891 | 9519 | 8176 | 8515 | 8685 | 8911 |
| Aged | 7480 | 7402 | 7431 | 9328 | 9328 | 8855 | 8460 | 8297 | 8007 | 6562 |

Example 11

An insulated wire was made by coextruding two polymeric compositions over an 18 AWG wire (diameter 0.046 inch). The first composition, which was melt extruded as an inner layer 0.008 inch thick, adjacent the wire, was a blend of PBT (79.59 parts) and TPE 1 (20.41 parts), the PBT and TPE 1 being as used in Examples 1–10. The second composition, which was melt-extruded as an outer layer, 0.002 inch thick, over the inner layer, was composed of an ethylene/chlorotrifluoroethylene copolymer sold under the trade name Halar 500.

Samples of the resulting insulated wire were coated with a phenolic epoxy varnish which is widely used as a sealant (Isopoxy 800, available from Schenectady), and the varnish was then cured at 190C for 1 hour. When the resulting wire was flexed, the varnish coating cracked, but the modified PBT insulating layer was not damaged.

are randomly copolymerized with the tetramethylene terephthalate units, and
   (2) a second polymer which has a recrystallization temperature greater than 150° C. and is a polyester block copolymer;
said blend having a ratio by weight of the second polymer to the aromatic polyester of from 0.05:1 to 0.35:1.

2. An assembly according to claim 1 wherein the polymeric component consists essentially of the aromatic polyester, the second polymer, and 0–20% by weight, based on the weight of the aromatic polyester, of one or more other polymers.

3. An assembly according to claim 2 wherein at least 95% by weight of a repeating units in the aromatic polyester are tetramethylene terephthalate units, and the second polymer is a thermoplastic elastomer which comprises:
   (a) aromatic polyester blocks in which a repeating units have the formula (I)

—O—(CH$_2$)$_p$—O.CO.Ar.— (I)

wherein p is at least 2 and Ar is an arylene group, and (b) aliphatic polyester blocks in which a repeating units have the formula (II)

—O—(CH$_2$)$_q$—O.CO.—(CH$_2$)$_r$—CO— (II)

wherein each of q and r, which may be the same or different, is at least 2.

4. An assembly according to claim 3 wherein the aromatic polyester is poly(tetramethylene terephthalate), and the thermoplastic elastomer contains 20 to 90% by weight of aromatic polyester blocks of formula I in which p is 4 and Ar is a 1,4-phenylene radical, and 10 to 80% by weight of aliphatic polyester blocks of formula II in which q is 4 and r is 4.

5. A composition according to claim 3 wherein the polymeric component has a ratio by weight of the thermoplastic elastomer to the aromatic polyester of 0.15:1 to 0.30:1.

6. An assembly according to claim 3 wherein the layer contacts the wire and is 0.003 to 0.030 inch thick.

7. An assembly according to claim 6 wherein the insulated wire, when subjected to a CFC extraction test, has less than 0.8% extractables.

8. An electrical assembly which comprises a hermetically sealed enclosure containing a refrigerant liquid and an insulated electrical wire which is within the enclosure and is contacted by the refrigerant, said insulated wire comprising a wire and polymeric insulation which surrounds the wire, the insulation comprising (A) an inner layer composed of a first melt-extruded polymeric composition which comprises a polymeric component which comprises a blend of
  (1) a thermoplastic aromatic polyester which consists essentially of 70 to 100% by weight of tetramethylene terephthalate units and 0 to 30% of other units which are randomly copolymerized with the tetramethylene terephthalate units, and
  (2) a second polymer which has a recrystallization temperature greater than 150° C. and is a polyester block copolymer;
said blend having a ratio by weight of the second polymer to the aromatic polyester of from 0.05:1 to 0.35:1; and (B) an outer layer composed of a second melt-extruded polymeric composition which comprises a polymeric component which consists essentially of one or more fluoropolymers.

9. An assembly according to claim 8 wherein
(a) the polymeric component in the inner layer consists of aromatic polyester, the second polymer, and 0–20% by weight, based on the weight of the aromatic polyester of one or more other polymers, and
(b) the polymeric component in outer second layer consists essentially of an ethylene/chlorotrifluoroethylene polymer.

10. An assembly according to claim 9 wherein, the ethylene/chlorotrifluoroethylene polymer has a ratio by weight of ethylene units to chlorotrifluoroethylene units of from 0.4:1 to 0.6:1.

11. An assembly according to claim 10 wherein the outer layer is 0.0005 to 0.005 inch thick.

12. An assembly according to claim 11 wherein the inner layer is 0.003 to 0.030 inch thick.

13. An assembly according to claim 8 wherein the outer layer contains more than 25% by weight of fluorine.

14. An assembly according to claim 8 wherein the outer layer consists essentially of a single crystalline fluoropolymer.

15. An assembly according to claim 8 wherein the outer layer contains 0–10% by weight, based on the weight of the composition, of non-polymeric ingredients.

16. An electrical assembly which comprises a hermetically sealed enclosure containing a refrigerant liquid and an insulated electrical wire which is within the enclosure and is contacted by the refrigerant, said insulated wire comprising a wire having an outside diameter of 0.116 to 0.029 inch (2.95 to 0.737 mm, 10 to 22 AWG) and polymeric insulation which surrounds the wire, the insulation consisting of (A) an inner layer which contacts the wire, which is 0.006 to 0.02 inch thick and which is composed of a first melt-extruded polymeric composition which comprises
  (i) a polymeric component which consists essentially of a blend of
    (1) polybutylene terephthalate, and
    (2) a second polymer which has a recrystallization temperature greater than 150° C. and which is a thermoplastic elastomer which comprises:
      (a) 70 to 90% by weight of aromatic polyester blocks in which repeating units have a formula (I)

—O—(CH$_2$)$_p$—O.CO.Ar.— (I)

wherein p is 4 and Ar is a 1,4-phenylene radical, and
      (b) 10 to 30% by weight of aliphatic polyester blocks in which the repeating units have the formula (II)

—O—(CH$_2$)$_q$—O.CO.—(CH$_2$)$_r$—CO— (II)

wherein each of q and r is 4;
    the ratio by weight of the thermoplastic elastomer (2) to the polybutylene terephthalate being from 0.15:1 to 0.30:1; and
    (3) 0–20% by weight, based on the weight of the polybutylene terephthalate, of one or more other polymers; and
  (ii) 0 to 10% by weight, based on the weight of the composition, of non-polymeric ingredients; and (B) an outer layer which is 0.001 to 0.004 inch thick and which is composed of a second melt-extruded polymeric composition which consists essentially of
  (i) at least one fluorinated polymer selected from ethylene/chlorotrifluoroethylene polymers and ethylene/tetrafluoroethylene polymers, and
  (ii) 0 to 10% by weight, based on the weight of the composition, of non-polymeric ingredients.

17. An electrical assembly which comprises an electrical motor, an insulated lead wire for delivering electrical power to the motor, a housing which surrounds the motor, and a layer of a cured epoxy polymer varnish which hermetically seals the housing and which extends over at least part of the insulated lead wire, the lead wire (i), when subjected to a CFC extraction test, having less than 0.8% by weight extractables, and (ii) comprising a wire and polymeric insulation surrounding the wire, the insulation comprising (A) an inner layer composed of a first melt-extruded polymeric composition which comprises a blend of
  (1) a thermoplastic aromatic polyester, and
  (2) a second polymer which has a recrystallization temperature greater than 150° C. and is a polyester block copolymer; and (B) an outer layer which is composed of a second melt-extruded polymeric composition comprising a fluoropolymer and which, when the varnish on the surface of the insulated wire cracks, prevents cracking of the varnish from causing cracking of the inner layer of insulation.

18. An assembly according to claim 17 wherein
(1) the thermoplastic aromatic polyester consists essentially of 70 to 100% by weight of tetramethylene terephthalate units and 0 to 30% of other units which are randomly copolymerized with the tetramethylene terephthalate units, and
(2) the second polymer has a recrystallization temperature greater than 150° C. and is a polyester block copolymer;
the first polymeric composition having a ratio by weight of the second polymer to the aromatic polyester of from 0.05:1 to 0.35:1.

19. An assembly according to claim 18 wherein the polymeric component consists essentially of the aromatic polyester, the second polymer, and 0–20% by weight, based on the weight of the aromatic polyester, of one or more other polymers.

20. An assembly according to claim 19 wherein at least 95% by weight of the repeating units in aromatic polyester are tetramethylene terephthalate units, and the second polymer is a thermoplastic elastomer which comprises:
(a) aromatic polyester blocks in which the repeating units have the formula (I)

—O—(CH$_2$)$_p$—O.CO.Ar.— (I)

wherein p is at least 2 and Ar is an arylene group, and
(b) aliphatic polyester blocks in which the repeating units have the formula (II)

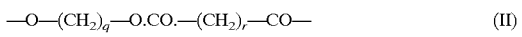
—O—(CH$_2$)$_q$—O.CO.—(CH$_2$)$_r$—CO— (II)

wherein each of q and r, which may be an equal or different number which is at least 2.

21. An assembly according to claim 20 wherein the aromatic polyester is poly(tetramethylene terephthalate), and the thermoplastic elastomer contains 20 to 90% by weight of aromatic polyester blocks of formula I in which p is 4 and Ar is a 1,4-phenylene radical, and 10 to 80% by weight of aliphatic polyester blocks of formula II in which q is 4 and r is 4.

22. An assembly according to claim 20 wherein a polymeric component has a ratio by weight of the thermoplastic elastomer to the aromatic polyester of 0.15:1 to 0.30:1.

23. An assembly according to claim 22 wherein the polymeric component in the second polymeric composition consists essentially of an ethylene/chlorotrifluoro-ethylene polymer.

24. An assembly according to claim 18 wherein the second polymeric composition comprises a polymeric component consists essentially of one or more fluoropolymers.

25. An assembly according to claim 24 wherein, the ethylene/chlorotrifluoro-ethylene polymer has a ratio by weight of ethylene units to chlorotrifluoroethylene units of from 0.4:1 to 0.6:1.

26. An assembly according to claim 24 wherein the outer layer is 0.0005 to 0.005 inch thick and the inner layer is 0.003 to 0.030 inch thick.

27. An assembly according to claim 17 wherein the outer layer contains more than 25% by weight of fluorine.

28. An assembly according to claim 17 wherein the outer layer consists essentially of a single crystalline fluoropolymer.

29. An assembly according to claim 17 wherein the outer layer contains 0–10% by weight, based on the weight of the composition, of non-polymeric ingredients.

* * * * *